United States Patent [19]

Nakamichi

[11] 3,881,187

[45] Apr. 29, 1975

[54] CASSETTE TYPE THREE HEAD TAPE RECORDER

[75] Inventor: Niro Nakamichi, Kodaira-Shi, Tokyo, Japan

[73] Assignee: Nakamichi Research, Inc., Kodaira-Shi, Tokyo, Japan

[22] Filed: Dec. 10, 1973

[21] Appl. No.: 423,491

[30] Foreign Application Priority Data

Dec. 11, 1972 Japan ........................ 47-142427[U]

[52] U.S. Cl. .................. 360/96; 360/105; 360/129; 360/130

[51] Int. Cl. ..... G11b 5/10; G11b 15/29; G11b 5/48

[58] Field of Search ............ 179/100.2 Z, 100.2 CA, 179/100.2 C; 340/174.1 F; 346/74 MC; 360/129, 130, 125, 118, 104, 93, 90, 96, 105; 242/194, 197–199, 76

[56] References Cited

UNITED STATES PATENTS

| | | | |
|---|---|---|---|
| 3,417,938 | 12/1968 | Markakis et al. | 179/100.2 Z |
| 3,534,182 | 10/1970 | Prochnow | 179/100.2 D |
| 3,669,457 | 6/1973 | Nozawa et al. | 179/100.2 Z |

*Primary Examiner*—Alfred H. Eddleman
*Attorney, Agent, or Firm*—Woodling, Krost, Granger & Rust

[57] ABSTRACT

A cassette type three head tape recorder comprising at least one erasing head and at least one pinch roller arranged in a closely spaced manner so that said erasing head and said pinch roller can extend through a common front opening in a cassette when they advance toward the cassette for playing the tape recorder.

10 Claims, 5 Drawing Figures

CASSETTE TYPE THREE HEAD TAPE RECORDER

FIELD OF THE INVENTION

This invention pertains generally to a cassette type tape recorder and more particularly to erasing head means suitably used especially for a cassette type tape recorder wherein a tape in a cassette reversibly moves for recording or reproducing it.

BACKGROUND OF THE INVENTION

A cassette commercially available for a two head type tape recorder has a predetermined number of openings in the front thereof, three of which are adapted to receive an erasing head, a recording and reproducing head and a pinch roller therethrough, respectively for engaging the tape running along the front face of the cassette, and the two remaining ones of which are idle. But, there has been employed a reversibly playing cassette type three head tape recorder in which two capstans and two erasing heads must be provided with one set of capstan and erasing head operated in one direction of the tape and with the other set of capstan and erasing head operated in other direction of the tape. Accordingly, the cassette must include openings through which one reproducing head, two recording heads, two erasing heads and two pinch rollers extend, respectively, but in such case the cassette must be modified because the commercially available cassette cannot be used for such tape recorder.

OBJECT OF THE INVENTION

Accordingly, it is a principal object of the present invention to provide a cassette type three head tape recorder in which a commercially available cassette can be used without any modification.

It is another object of the present invention to provide a cassette type tape recorder of the aforesaid type in which each of erasing heads is compactly arranged with respect to corresponding one of pinch rollers to facilitate assembly of the erasing heads and pinch rollers.

It is further object of the present invention to provide erasing head means suitable for a reversibly playing cassette type three head tape recorder.

SUMMARY OF THE INVENTION

In accordance with the present invention, there is provided a cassette type three head tape recorder comprising a cassette having a tape extending along the front openings in said cassette and wound between a pair of reels therein, capstan means removably received in said cassette and disposed behind said tape, head means including a reproducing head, at least one recording head and at least one erasing head, said head means adapted to advance toward and withdraw from said cassette, and at least one pinch roller adapted to move together with said head means, characterized by that said erasing head is arranged by the side of said pinch roller and concaved at the wall facing to said pinch roller so that said pinch roller is closely spaced from said erasing head whereby said erasing head together with said pinch roller extends through one of said front openings in said cassette when said head means and said pinch roller advance toward said cassette.

BRIEF DESCRIPTION OF THE DRAWINGS

The above-mentioned and other objects and features of the present invention will become apparent to those skilled in the art from the following description of the embodiments in accordance with the present invention taken with reference to the accompanying drawings.

DETAILED DESCRIPTION OF THE PREFERRED EMBODIMENTS

Figure 1:
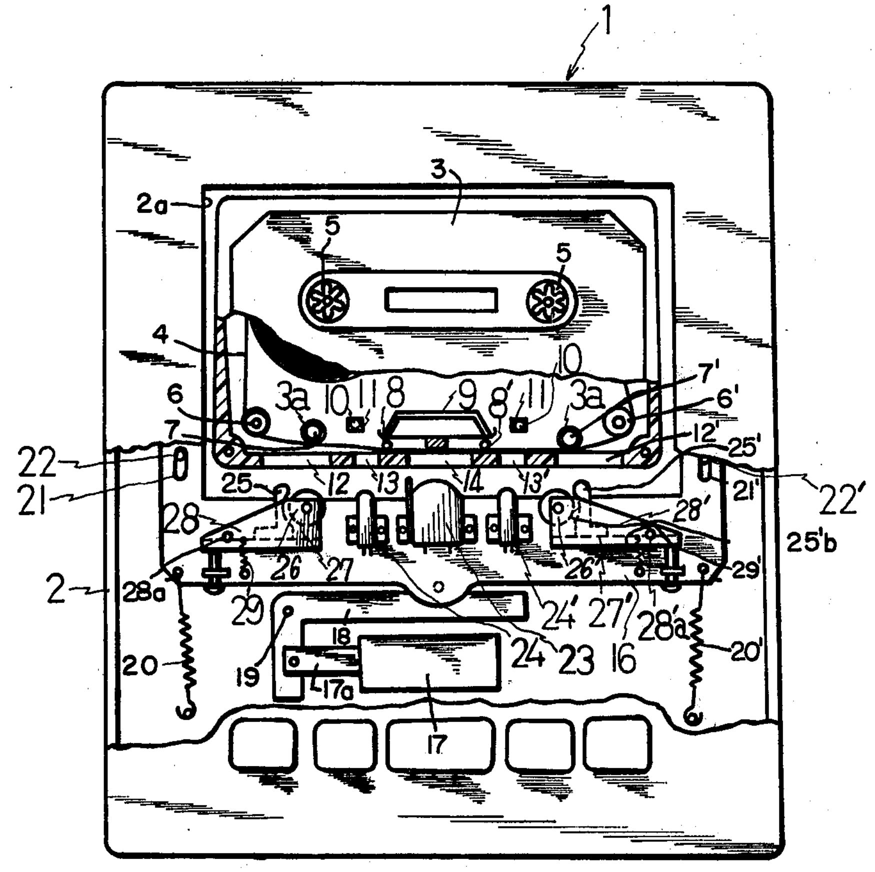
FIG. 1 is a top view of a cassette type three head tape recorder in accordance with the present invention, with a portion broken away for illustration.

Referring now to FIG. 1, a reversibly playing cassette type three head tape recorder is illustrated generally at numeral 1, which comprises a cabinet 2 with a portion thereof shown to be broken away for illustration of the present invention. The cabinet is conventionally provided with a recess 2*a* which receives a cassette 3 having a tape 4 contained and wound between a pair of spaced reels 5.

As seen from FIG. 1, the cassette 3 has a pair of guide rollers 6 and 6′ provided on the cassette at the front corners thereof and a pair of tape guides 8 and 8′ intermediate of the guide rollers 6 and 6′. The tape guides 8 and 8′ may be mounted on a bracket 9 which is in turn secured to the cassette bottom wall. A pair of capstans 7 and 7′ are rotatably mounted on the chassis of the cabinet 2 and relatively moved into and removed from the cassette through the bottom openings 3*a* thereof. The tape 4 can pass from one of the reels 5 through the guide roller 6 and then through the capstan 7 to engage the tape guide 8 and 8′, from which it passes through the capstan 7′ and then through the guide roller 6′ to the other reel 5. The tape can pass in other direction in a similar manner.

The cassette has an operative position shown in FIG. 1 in which the cassette can be fully received in the recess 2a for play of the tape recorder and a non-operative position (not shown) in which the cassette is pivotally raised up at the front thereof for removal from the cabinet 2. In the operative position the cassette may be positioned with a pair of locating pins 10 and 10′ received in pin sockets 11 and 11′ in the cassette 3. Movement of the cassette 3 to the operative position causes the capstans 7 and 7′ to be relatively moved into the cassette through the bottom openings 3a in the cassette and movement of the cassette 3 to the non-operative position causes the capstans to be relatively removed out of the cassette. The capstans 7 and 7′ are conventionally connected to shafts (not shown) integral therewith and driven by a reversible electric motor (not shown) when the cassette 3 is in the operative position shown in FIG. 1.

Figure 2:
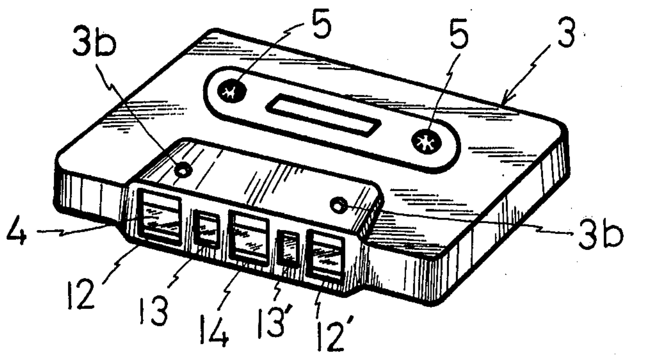
FIG. 2 is a perspective view of a cassette employed for the tape recorder as shown in FIG. 1.

The cassette 3, which is identical to that employed for a cassette type two head tape recorder as shown in FIG. 2, is provided with five small front openings 12, 12′, 13, 13′ and 14, two outside openings of which are arranged in a facing relationship to the capstans 7 and 7', each for entrance of an associated pinch roller described later. Two inside openings 13 and 13' are arranged adjacent and outside of the tape guides 8 and 8', each for entrance of a recording lead described later and the center opening 14 is arranged between the tape guides 8 and 8' for entrance of a reproducing head described later. Two perforations 3*b* are adapted to receive the upper ends of the capstans 7 and 7'.

A movable head mounting plate 16 is provided to mount heads and associated components thereon. The movable plate 16 comprises a substantially U-shaped plate and is disposed in the cabinet 2 in a facing relationship to the front of the cassette in the operative position. On the chassis of the cabinet 2 may be mounted an extendable cylinder 17, a piston rod 17*a* of which at the end thereof is connected to one arm portion of a lever 18 which is in turn pivotally mounted on the chassis about an axis 19. The other arm portion of the lever 18 is connected to the movable plate 16 at the middle portion thereof for allowance of lateral movement of the lever arm portion relative to the movable plate 16. Thus, extension of the piston rod 17*a* causes the lever 18 to pivot about the axis 19 to a retracted or non-operative position as shown in FIG. 1. On the contrary, retraction of the piston rod 17*a* causes the lever 18 to pivot about the axis 19 in a counterclockwise direction as viewed in FIG. 1 to an advanced or operative position. A pair of traction springs 20 and 20', which are disposed adjacent to the corners of the plate 16 and mounted between the plate 16 and the chassis, may preferably urge the head mounting plate 16 to be retracted to the non-operative position. It will be understood that any other suitable means may be employed which advances or retracts the plate 16. In order to guide the forward or backward movement 16 of the head mounting plate 16 a pair of guide slots 21 and 21' are provided in the leg portions of the plate 16 and a pair of corresponding pins 22 and 22' on the chassis are received in the slots 21 and 21'.

A reproducing head 23 is mounted on the head mounting plate 16 at the middle portion thereof for engagement with the tape in the cassette through the opening 14 thereof when the plate 16 is advanced to the operative position. A pair of recording heads 24 and 24' are also mounted on the head mounting plate 16 on both sides of the head 23 for engagement with the tape in the cassette through the openings 13 and 13' in the advanced position of the plate 16. It will be understood that when the tape moves rightwardly as viewed in FIG. 1 for recording it, the recording head 24 is in the operative condition and when the tape moves leftwardly, the recording head 24' is in the operative condition.

A pair of erasing heads 25 and 25' are arranged adjacent to pinch rollers 26 and 26', respectively and mounted on the head mounting plate 16 so that the former together with the latter extend through the corresponding openings 12 and 12'. It will be also understood that when the tape moves rightwardly as viewed in FIG. 1 for recording it, the erasing head 25 is in the operative condition and when the tape moves leftwardly, the erasing head 25' is in the operative condition. In the illustrated embodiment of FIG. 1, the erasing heads 25 and 25' and the pinch rollers 26 and 26' are combined in the form of an erasing head-pinch roller assembly 27 or 27', respectively. The erasing head-pinch roller assemblies 27 and 27' comprise frames 28 and 28', respectively, which are pivoted about respective axes 28*a* and 28'*a* on the head mounting plate 16 adjacent to the opposite ends thereof. Traction springs 29 and 29' are secured at one ends thereof to the respective frames 28 and 28' and at the other ends to the head mounting plate 16 so that the inward edges of the frames 28 and 28' are urged to move toward the front of the cassette 3. The pinch rollers 26 and 26' are rotatably mounted on the respective frames 28 and 28' about the axes 26*a* and 26'*a* and the erasing heads 25 and 25' are arranged by the side of the respective pinch rollers 26 and 26' and mounted on the frames 28 and 28' with the bases 25a and 25'*a* of the erasing heads secured to the webs of the respective frames 28 and 28' by any suitable means (FIG. 3).

Figure 3:
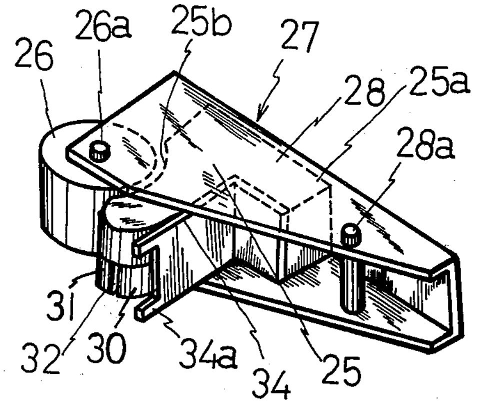
FIG. 3 is an enlarged perspective view of a pinch roller and erasing head assembly incorporated in the tape recorder shown in FIG. 1.
Figure 4:
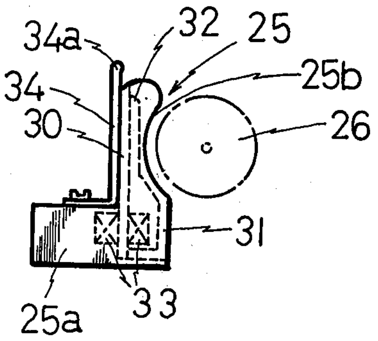
FIG. 4 is an enlarged top view of arrangement of the pinch roller and the erasing head.

FIGS. 3 and 4 show one of the erasing head-pinch roller assemblies 27 and 27'. As seen from these figures, the erasing head 25 may be generally L-shaped and the side surface 25*b* of the head facing to the pinch roller 26 is concavely curved so that the erasing head 25 and the pinch roller 26 can be spaced as closely as possible for allowance of entrance of the head 25 together with the pinch roller 26 into the opening 12 in the cassette. Similarly, the erasing head 25' has the concaved surface 25'*b* as shown in FIG. 1. The erasing head 25, as conventionally constructed, comprises cores 30 and 31 faced to each other with a gap 32 defined between the leading edges of the cores 30 and 31 and a coil 33 wound around the core 30 at the base portion thereof. The erasing head 25 may have a guide member 34 mounted on and secured to the outer side of the head by any fastner, such as screw so that the tape 4 can be guided between the legs 34*a* of the guide member in the advanced position of the head mounting plate 16. Of course, the erasing head 25' has the same construction as the erasing head 25. It should be noted that the erasing head-pinch roller assemblies 27 and 27' extend through the openings 12 and 12', respectively when the plate 16 advances toward the cassette 3 until the erasing heads 25 and 25' and the pinch rollers 26 and 26' engage the tape 4 and the capstans 7 and 7', respectively.

Figure 5:
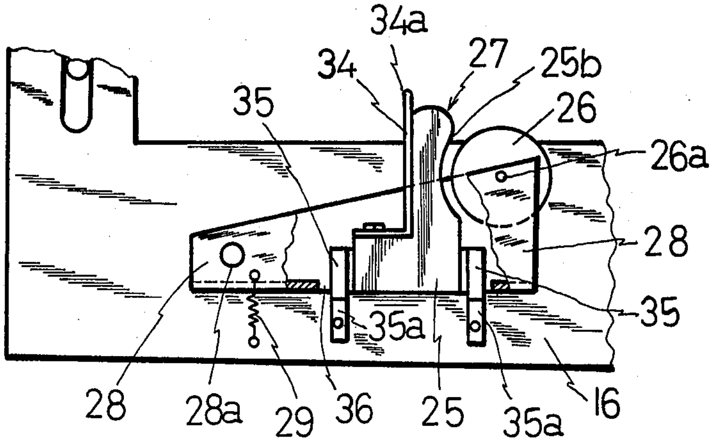
FIG. 5 is a top view of a modification of arrangement of the pinch roller and the erasing head.

Referring now to FIG. 5, there is illustrated a modification of the erasing head pinch roller assembly 27. In this modification, the erasing head 25 is mounted directly on the head mounting plate 16 by securing the legs 35, 35' of the head 25 at their base portions 35*a*, 35'*a* to the plate 16 by any suitable means, such as screws and the pinch roller 26 is mounted on the pivotal frame 28 in a same manner as described in the aforesaid embodiment. It will be noted that the frame 28 has an opening 36 provided in the web of the frame for allowance of the erasing head 25 to move into and remove from the opening 36 in the frame when the pinch roller 26 acts against the spring 29. Although not shown, the opposite erasing head-pinch roller assembly is symmetrically constructed to the aforesaid assembly 27.

While some preferred embodiments of the present invention have been illustrated and described with reference to the accompanying drawing, it will be apparent to those skilled in the art from the teachings of the description that various changes and modifications in arrangement and construction might have been made without departing from the spirit and scope of the present invention, which has been defined only to the appended claims.

What is claimed is:

1. A cassette type three head tape recorder comprising a cassette having a tape extending along the small front openings in the cassette and wound between a pair of reels therein, capstan means removably received in said cassette and disposed behind said tape, head means including a reproducing head, at least one recording head and at least one erasing head, said erasing head disposed upstream of said associated recording head, said head means adapted to advance toward and withdraw from said cassette, and at least one pinch roller adapted to move together with said head means, said small front openings each substantially receiving one of said heads and said pinch roller, characterized by that said erasing head is arranged by, the side of said pinch roller and concaved at the wall facing to said pinch roller is closely adjacent to and spaced from said erasing head whereby said erasing head together with said pinch roller extends through one of said small front openings in said cassette when said head means and said pinch roller advance toward said cassette.

2. A cassette type tape recorder as set forth in claim 1, further comprising a frame arranged movable toward and away from said cassette and wherein said erasing head and said pinch roller are mounted on said frame.

3. A cassette type tape recorder as set forth in claim 1, and wherein said erasing head and said pinch roller are individually arranged in a closely spaced manner.

4. A cassette type tape recorder as set forth in claim 2, further comprising a head mounting plate movable toward and away from said cassette and wherein said frame is mounted on said head mounting plate.

5. A cassette type tape recorder as set forth in claim 2, further comprising a head mounting plate movable toward and away from said cassette and wherein said frame is pivotally and resiliently mounted on said head mounting plate so that said erasing head and said pinch roller are urged to engage said tape and said capstan means, respectively.

6. A cassette type tape recorder as set forth in claim 1, further comprising a head mounting plate movable toward and away from said cassette and wherein said erasing head is secured to said head mounting plate and said pinch roller is mounted on a frame pivotally and resiliently mounted on said head mounting plate so that said pinch roller is urged to engage said capstan means.

7. A cassette type reversibly playing three head tape recorder comprising a cassette having a tape extending along the small front openings in said cassette and wound between a pair of reels therein, a pair of capstans removably received in said cassette and disposed behind said tape, head means including a reproducing head, a pair of recording heads and a pair of erasing heads, said erasing heads each disposed upstream of the associated one of said recording heads, said head means adapted to advance toward and withdraw from said cassette, and a pair of pinch rollers adapted to move together with said head means, said small front openings each substantially receiving one of said heads and said pinch rollers, characterized by that said erasing heads are arranged by the side of said pinch rollers, respectively and concaved at the walls facing to said respective pinch rollers so that said pinch rollers are closely adjacent to and spaced from said respective erasing heads whereby said erasing heads together with said respective pinch rollers extend through respective ones of said small front openings in said cassette when said head means and said pinch rollers advance toward said cassette.

8. A cassette type tape recorder as set forth in claim 7, further comprising frames arranged movable toward and away from said cassette and wherein said erasing heads and said pinch rollers are mounted on said frames, respectively.

9. A cassette type tape recorder as set forth in claim 7, and wherein said erasing heads and said pinch rollers are individually arranged in a closely spaced manner.

10. Erasing head in use with a pinch roller for a cassette type three head tape recorder, said erasing head having a concaved side facing to said pinch roller whereby said erasing head can be closely spaced from said pinch roller.

* * * * *